Patented Oct. 19, 1937

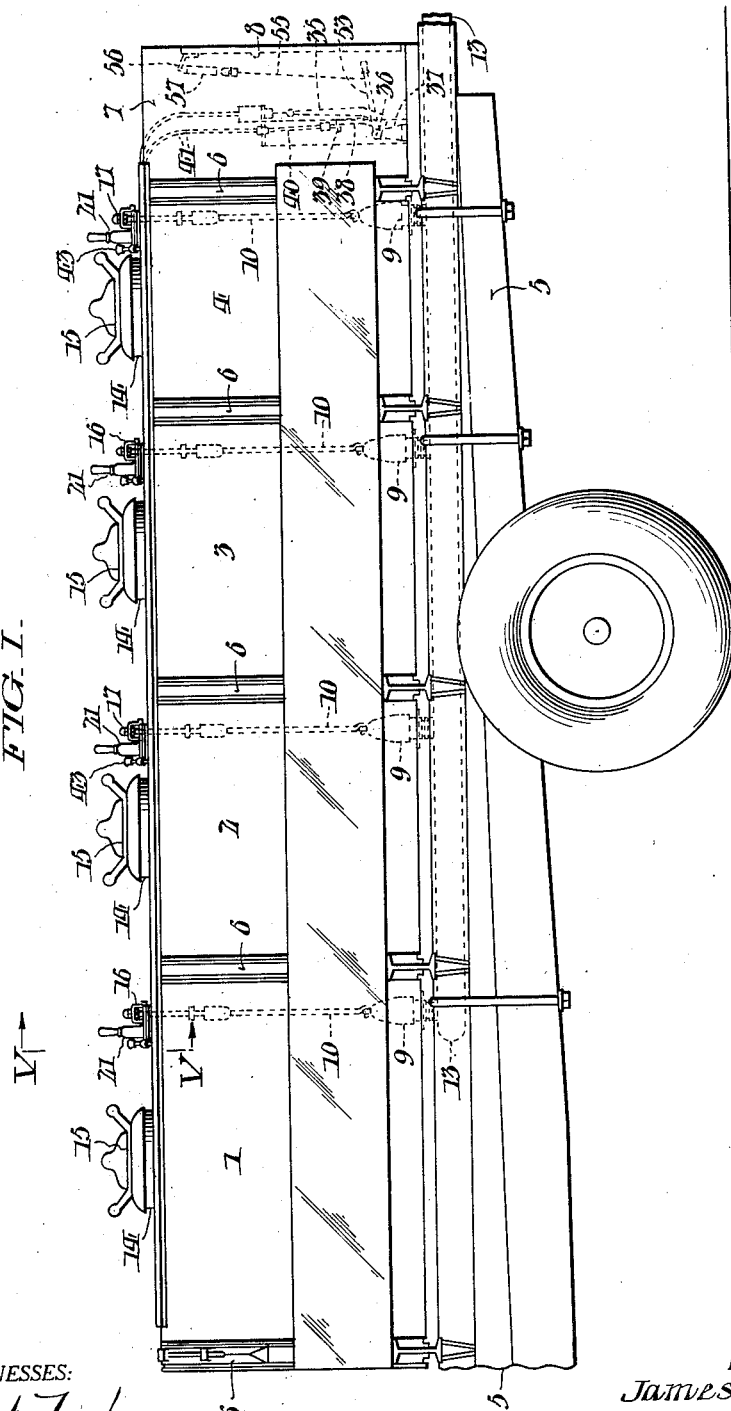

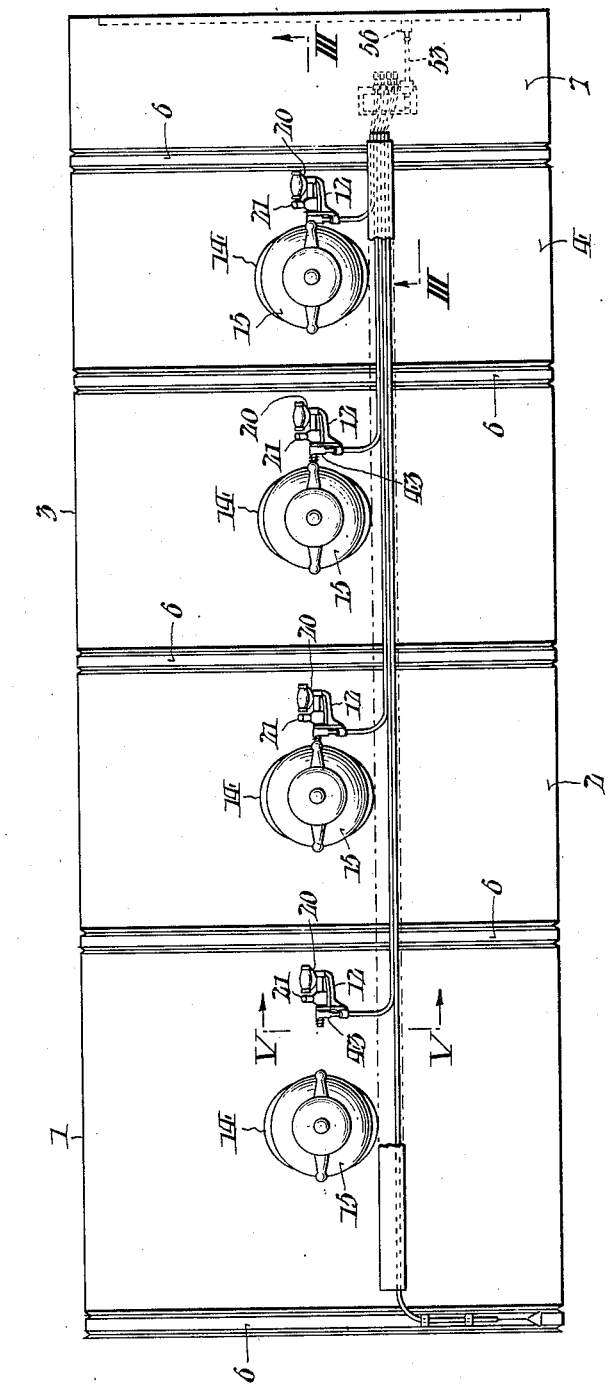

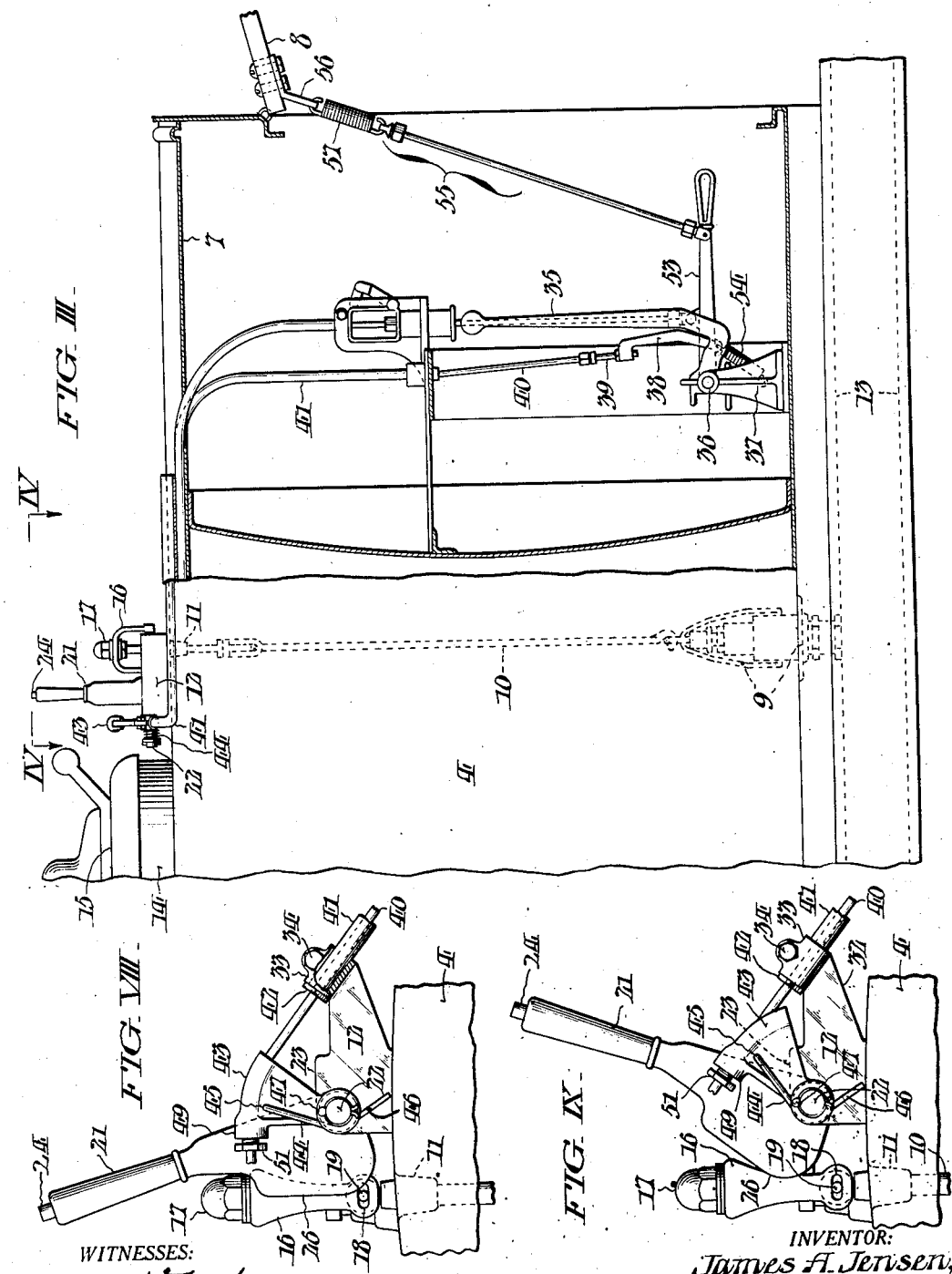

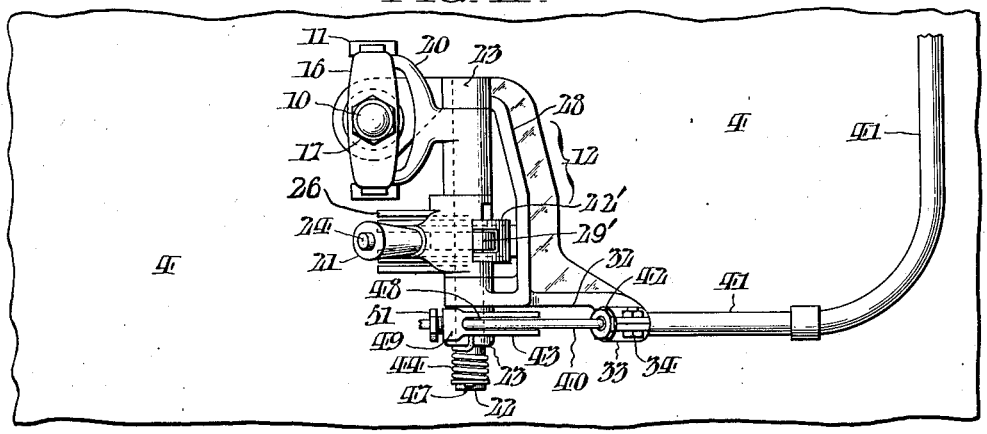

2,096,374

UNITED STATES PATENT OFFICE 2,096,374

VALVE CONTROL MECHANISM FOR TANK VEHICLES

James A. Jensen, Philadelphia, Pa., assignor to Quaker City Iron Works, Philadelphia, Pa., a corporation of Pennsylvania Application August 31, 1935, Serial No. 38,728

15 Claims. (Cl. 137—21)

This invention has reference to valve control mechanism for multi-compartment tank vehicles of the type such as are commonly employed in the transportation and delivery of gasoline, oils and other liquids; each compartment having an individual balanced type valve outlet with an emergency control and the vehicle being provided with a rear end compartment housing the valve operating mechanism.

The primary object of this invention is to render possible the actuation of the valves of vehicle tanks and the like, of the above indicated type, individually or selectively in groups from a distant point, for example, at the rear end of the vehicle; or to actuate them individually at points local to the respective compartments. This object is preferably, although not essentially, accomplished in practice by combining the mechanisms separately featured in U. S. Patents Nos. 1,932,972 and 1,985,207 respectively granted to me on October 31, 1933, and December 18, 1934; with elimination, however, of the bulky, somewhat complicated and expensive lever-and-linkage system of the latter patent.

Another object of this invention is to effect the combination of the preceding paragraph by means of a novel coupler device whereby the flexible connector of the first mentioned patent is operatively attached to the local valve actuator mechanism.

Further objects of the invention are to simplify and improve the construction and operation of valve control mechanisms of the noted character, to render them less expensive to manufacture and install, substantially fool-proof, not liable to get out of order, and otherwise well adapted for the purposes set forth.

With the foregoing general objects in view the invention will now be described by reference to the accompanying sheets of drawings illustrating a form of construction thereof that has been devised for embodying said invention, after which the various novel features therein-contained will be particularly set forth and claimed.

In the drawings:

Fig. I is a part side elevation of a tank vehicle embodying the improved valve control mechanism of this invention.

Fig. II is a top plan view with parts broken out and others omitted for convenience of illustration.

Fig. III is a vertical section through the rear end of the tank vehicle, taken approximately as indicated by the arrows III—III in Fig. II, and drawn to a larger scale.

Fig. IV is a fragmentary plan view of the parts embraced within the zone indicated in part by the arrows IV—IV on Fig. III, and also drawn to a larger scale.

Fig. V is a fragmentary elevation taken substantially as indicated by the arrows V—V on Figs. I and II, but drawn to a much larger scale. and showing in side view the parts illustrated in Fig. IV.

Fig. VI is a perspective view of a bracket structure, hereinafter fully described.

Fig. VII is a detail view partly in section of a novel segmental sheave and cable securing means.

Fig. VIII is a detail elevation showing the valve actuating parts in the position occupied when the drain valve is closed; and, Fig. IX is a corresponding illustration showing said parts in the position they occupy when the drain valve is open.

In all the views, corresponding parts are designated by the same reference characters.

Referring more particularly to the drawings, the tank vehicle shown comprises four consecutive compartments 1, 2, 3, and 4, of differing capacity which are conveniently bound together and to the chassis 5 by suitable straps 6; and at the rear end of said vehicle is a utility or can box 7, having a hinged door 8 adapted for vertical movement to the open or closed position in an obvious manner. Each tank compartment 1–4 is provided with a bottom drain outlet under control of a balanced-type emergency valve 9 having an upward rigid pull connection 10, passing through a stuffing-box 11 which forms part of a bracket 12 at the top of the tank compartment; while all of said drain outlets communicate into a longitudinal discharge conduit 13. Furthermore, each tank compartment 1–4 is provided with a man-hole 14 having a removable cover 15, in accordance with conventional practice.

The valve control mechanism somewhat conforms with the disclosure of prior Patent No. 1,985,207 hereinbefore referred to, that is to say, each pull connection 10 is provided at its top with a yoke 16 adjustably held between a pair of nuts 17 threadedly engaged upon the upper end of such connection. The yoke 16 has its free ends slotted at 18 for reception of the laterally projecting pintles 19 on a fork 20 Figs. II and IV, integrally formed as part of a hand lever 21, mounted for free swinging movement on a longitudinal shaft 22, in bearings 23 afforded by the bracket 12 above referred to, illustrated in detail as a unit in Fig. VI, and conveniently secured on the tank shell by appropriate welds, not shown.

Each hand lever 21 is fitted with a push rod 24, having its inner end connected to a detent 25 disposed between the spaced cheeks 26 of said hand lever, and having its pivotal center at 27. Also, rigidly fixed to the shaft 22 between the cheeks 26 is a clevis member 22' having teeth 22" for coaction with the detent 25 as in Patent No. 1,985,207.

Referring again to the bracket 12 it will be best appreciated from Fig. VI, more particularly, that the same corresponds somewhat with the disclosure in prior Patent No. 1,985,207 in that it embodies spaced bearing sections 23 connected by a T-section bridge 28 with the integrally formed stuffing-box 11 for the pull connection 10, and a shoe portion 29 having upstanding ears 30 whereto a toothed sector 29' is secured against rocking movement by a pin 31, said sector being free on the shaft 22, and flankingly lapped by the sides of the clevis toothed member 22' aforesaid. However, in accordance with the present invention, the bracket 12 is provided with an arm 32, in continuation of the bridge 28, said arm having a longitudinally-split cylindrical portion 33 adapted for clamping action by means of a bolt 34.

The mechanism for selectively operating the drain valves 9 corresponds substantially with that set forth in prior Patent No. 1,932,972, that is to say, it includes a group of segregated controls having the form of angular lever-handles 35, corresponding in number with that of said valves, and which are located in the utility-box 7. These handles 35 are fulcrumed for independent action on a shaft 36 supported in a bearing device 37 secured to the floor of the utility-box. Connected with the handles 35 are toggle links 38 having at their upper ends slack adjusting means 39 in turn secured to operating cables 40, passed through suitably arranged guide tubes 41 to the individual clamping portions 33 of the bracket 12. On reference more particularly to Fig. VIII, it will be seen that the free end of each guide tube 41 is screw-threaded to receive a lock nut 42, and that after the latter is tightened-up the bolt 34 is likewise tightened-up so that said tube is not only prevented from longitudinal movement but also is restrained against rotation with the result that the cables 40 are always free for longitudinal actuation without any possibility of developing kinks or twists tending to impede their positive operation.

Each shaft 22 has suitably secured thereon a segmental sheave 43 under the influence of a recoil spring 44 freely fitting around the end of the shaft 22 and having one of its terminii engaged in an aperture 45 through said sheave, with its other end 46 in arrestive contact against the tank shell. The coiled portion of the spring 44 is prevented from axial movement off the end of the shaft 22 by a cotter pin 47, and it is to be noted that its recoil tendency is constantly in a counterclockwise direction, so that the normal action of said spring is to constantly keep the end 46 in engagement with the tank shell and hold the hand lever 21 in the position of Figs. V and VIII, with the associated cable connected lever handle 35 vertical, Fig. III.

To effect connection of the cable end to the segmental sheave 43, the latter is provided with a groove 48 having at its forward end a counterbored enlargement 49, suitably shaped at its rear for snug reception of a split wedge-sleeve 50 through which the free end of the cable 40 is passed. The wedge-sleeve 50, is securely locked in position in the counterbored enlargement 49, as well as immovably clamped about the cable 40, by means of a tubular jam-nut 51 threadedly engaged in the outer end of the enlargement 49, as best shown in Fig. VII. It is also to be noted that both ends of the wedge-sleeve are tapered at 52 for joint coaction with correspondingly-inclined confronting faces in the bore of the enlargement 49 and inner end of the tubular jamb-nut 51. By the just described means of securing the cable 40 to the segmental sheave 43, it will be seen that the terminal portion of said cable is rigidly attached to the segmental-sheave 43 with the adjacent portion supported in the groove 48 so as to be tangential throughout the movement of the shaft 22.

As in prior Patent No. 1,932,972 a supplemental lever handle 53, Fig. III, is provided in connection with the shaft 36 and subject to a tension spring 54 for restoration of any one of the individual valve actuating lever handles 35 to the normal upright position. In the event one of the valves 9 has been previously opened, it will be understood that when the associated lever handle 35 is tripped upward that the detent 25 will be released from arrested engagement with the sector 29', by the teeth 22" of the clevis member 22', as in the patent just referred to, for effecting automatic closure of the said opened valve 9. As a safeguard to positively ensure that all of the drain valves 9 are closed after making a delivery, the lever handle 53 is connected to the hinged door 8 by means of a link connection 55 and anchorage 56 with an interposed tension spring 57, which serves as the door 8 is closed to automatically lift the lever handle 53 with resultant closure of any open drain valve 9.

From the foregoing it is thought the merits and advantages of this invention will be clearly understood and while a specific embodiment thereof has been described, the same is not to be considered as limitative, inasmuch as minor changes may be readily effected in adapting said invention to different types of tank vehicle valve-controlling mechanism without departing from the spirit and scope thereof as more particularly specified in the following claims.

Having thus described the invention, I claim:—

1. In control mechanism for multiple-compartment tank vehicles having individual valves to govern discharge of liquids therefrom, the combination of means for actuating the valves individually or selectively in groups from a distant point, pull-up means to actuate the valves individually at points local to the respective compartments, and automatically-operative recoil-mechanism for releasing the local actuator means to effect concurrent closure of the respectively associated valves.

2. In control mechanism for multiple-compartment tank vehicles having individual valves to govern discharge of liquids therefrom, the combination of means for actuating the valves individually or selectively in groups from a distant point, automatically-releasable pull-up means to actuate them individually at points local to the respective valves, and automatically-retractible flexible connectors coordinating the respective distant and local actuating means for each valve.

3. In control mechanism for multiple-compartment tank vehicles having individual valves to govern discharge of liquids therefrom; the combination of automatically-releasable actuator mechanism local to each valve for operating them individually; cable coordinated actuator mechanism at the rear of the vehicle whereby said valves may be operated individually, or selectively in groups; and a recoil-influenced rotatable-member tangentially-guiding and rigidly-coupling the cable to the local actuator mechanism.

4. The combination of claim 3 wherein the recoil-influenced rotatable-member comprises a spring-influenced peripherally-grooved segmental-sheave included in the local actuator mechanism, and a composite split cable-wedge and jamb means secures the cable end in the groove and to one end of said segmental sheave.

5. In control mechanism for multiple-compartment tank vehicles having individual valves to govern discharge of liquids therefrom; the combination of automatically-releasable actuator mechanism local to each valve for operating them individually; cable coordinated distant actuator mechanism, at the rear of the vehicle, whereby said valves may be operated individually, or selectively in groups; a recoil-influenced rotatable-member tangentially-guiding and rigidly coupling the end of the cable to the local actuator mechanism, and trip means whereby any pre-set distant actuator mechanism or group of such mechanisms, can be released to effect automatic closure of the associated valve or valves when a delivery of liquid is made.

6. In valve control mechanism as claimed in Claim 5 wherein the recoil-influenced rotatable-member includes a composite split-wedge and jamb-means for securing the flexible connector end to said rotatable member.

7. In valve control mechanism for tank vehicles including local and cable-coordinated distant actuating mechanisms, the combination of an adjustable bearing for the cable, means whereby said bearing can be stationarily fixed at the requisite adjustment, a relatively rotatable member affording tangential support for the cable during movement of said member, and composite split-wedge and jamb-means attaching the cable to the rotatable member.

8. In valve control mechanism for tank vehicles including local and cable-coordinated distant actuating mechanisms, the combination of a stationary split clamp for a cable guiding tube, a relatively rotatable segmental member affording tangential support for the cable during movement of said member, and a composite split-wedge sleeve and jamb-nut attaching the cable to the segmental member at one side thereof.

9. The combination of claim 8 wherein the split clamp is of cylindrical form to embrace the cable guiding tube end, and said tube end is fitted with a lock nut, whereby said tube end is rigidly held against rotary or axial movement.

10. In a valve control mechanism for multi-compartment tank vehicles including local and cable-coordinated distant mechanisms governing discharge of liquid through suitable valve-controlled outlets form the individual compartments, the combination of a stationary split clamp for a cable guiding tube end, a relatively-rotatable reactive segmental-sheave affording tangential support for the adjoining cable end portion during rotation of said sheave, and a composite split wedge-sleeve and tubular jamb-nut attaching the cable to the segmental-sheave at one side thereof.

11. The combination of claim 10, wherein the segmental sheave is spring-influenced in a counter-clockwise direction, and said sheave is provided with a peripheral groove and embodies an aligning counterbored enlargement at one end thereof.

12. The combination of claim 10 wherein the split wedge-sleeve seats in the enlargement counter-bore and is adapted to closely embrace the cable, a tubular jamb-nut threadedly engages in the counterbore outer end, and said wedge-sleeve has tapering ends for coaction with corresponding faces in the counterbore inner end and confronting end of the jamb-nut to effect rigid fixture therein of the cable free end.

13. In valve control mechanism for tank vehicles of the type described, an actuator segmental sheave having a peripheral groove with an aligning counterbored enlargement at one end thereof, said counterbore having a smaller diameter inner portion with a tapering end and an outer internally screw-threaded portion of relatively larger diameter.

14. In valve control mechanism for tank vehicles of the type described, a supporting bracket embodying as a unit spaced shaft bearings connected by a T-section bridge, a stuffing-box integral with one of the bearings, a shoe having upstanding apertured ears intermediate the spaced bearings and projecting from the bridging portion, and a reversely-directed arm projecting from the other bearing section, said arm terminating in a split cylindrical clamping section.

15. In a control mechanism for multiple-compartment tank vehicles having individual self-closing valves to govern discharge of liquids therefrom, the combination of automatically-releasable local and distant individual valve closing and valve opening mechanisms respectively for each said valve, a flexible connector coordinating each local and distant mechanism, a recoil-influenced rotatable grooved-sector affording attachment and tangential guidance for each flexible connector to the associated local mechanism, and means whereby the other end of each flexible connector is connected to the corresponding distant mechanism with provision for holding the valve in open position.

JAMES A. JENSEN.